United States Patent
Ozaki et al.

(10) Patent No.: US 11,952,500 B2
(45) Date of Patent: Apr. 9, 2024

(54) AQUEOUS GRAVURE PRINTING INK

(71) Applicant: KAO CORPORATION, Tokyo (JP)

(72) Inventors: Yuki Ozaki, Izumisano (JP); Yasufumi Ueda, Wakayama (JP); Ryuma Mizushima, Wakayama (JP); Takuto Matsuzono, Tokyo (JP)

(73) Assignee: KAO CORPORATION, Tokyo (JP)

( * ) Notice: Subject to any disclaimer, the term of this patent is extended or adjusted under 35 U.S.C. 154(b) by 713 days.

(21) Appl. No.: 16/972,419

(22) PCT Filed: Apr. 2, 2019

(86) PCT No.: PCT/JP2019/014626
§ 371 (c)(1),
(2) Date: Dec. 4, 2020

(87) PCT Pub. No.: WO2019/235048
PCT Pub. Date: Dec. 12, 2019

(65) Prior Publication Data
US 2021/0163767 A1    Jun. 3, 2021

(30) Foreign Application Priority Data
Jun. 8, 2018   (JP) .................................. 2018-110368

(51) Int. Cl.
| C09D 11/037 | (2014.01) |
| C09D 11/107 | (2014.01) |
| C09D 11/108 | (2014.01) |
| C08K 5/23 | (2006.01) |

(52) U.S. Cl.
CPC .......... *C09D 11/037* (2013.01); *C09D 11/107* (2013.01); *C09D 11/108* (2013.01); *C08K 5/23* (2013.01)

(58) Field of Classification Search
CPC ... C09D 11/037; C09D 11/107; C09D 11/108; C08K 5/23
USPC ....................................................... 524/190
See application file for complete search history.

(56) References Cited

U.S. PATENT DOCUMENTS

| 2017/0369725 A1 | 12/2017 | Mitsuyoshi et al. |
| 2018/0187034 A1* | 7/2018 | Takeno ............... B41J 2/2107 |
| 2018/0244932 A1 | 8/2018 | Shigeta et al. |
| 2021/0163765 A1 | 6/2021 | Ozaki et al. |

FOREIGN PATENT DOCUMENTS

| CN | 101092531 A | 12/2007 |
| JP | 62-290772 A | 12/1987 |
| JP | 10-158564 A | 6/1998 |
| JP | 2002-188029 A | 7/2002 |
| JP | 2016-44282 A | 4/2016 |
| JP | 2017-155186 A | 9/2017 |
| JP | 2018-83938 A | 5/2018 |
| WO | WO 2016/104294 A1 | 6/2016 |
| WO | WO 2016/208719 A1 | 12/2016 |
| WO | WO 2017/047267 A1 | 3/2017 |
| WO | WO 2018/088560 A1 | 5/2018 |
| WO | WO 2020/090524 A1 | 5/2020 |

OTHER PUBLICATIONS

International Search Report, issued in PCT/JP2019/014626, PCT/ISA/210, dated Jun. 25, 2019.
Extended European Search Report for European Application No. 19814298.6, dated Feb. 7, 2022.

* cited by examiner

*Primary Examiner* — Hui H Chin
(74) *Attorney, Agent, or Firm* — Birch, Stewart, Kolasch & Birch, LLP

(57) ABSTRACT

The present invention relates to an aqueous gravure ink containing a pigment, a water-soluble organic solvent, a surfactant and water, in which the water-soluble organic solvent contains a glycol ether having a boiling point of 100 to 260° C.; the surfactant contains a silicone-based surfactant containing a specific constitutional unit; a content of the water-soluble organic solvent in the ink is 1 to 10% by mass; and a content of water in the ink is 50 to 80% by mass. This ink exhibits a less burden on the environments, and is excellent in optical density and drying properties.

13 Claims, No Drawings

US 11,952,500 B2

AQUEOUS GRAVURE PRINTING INK

FIELD OF THE INVENTION

The present invention relates to an aqueous gravure ink.

BACKGROUND OF THE INVENTION

Gravure printing is a printing method in which an ink is transferred to a printing substrate using a gravure printing plate on which cells for receiving the ink are formed. The gravure printing is capable of well controlling a printing quality of the resulting printed material by suitably adjusting a depth of the respective cells and a distance between the cells (the number of screen lines) to thereby conduct high-definition printing, and therefore has been generally utilized in extensive applications.

As gravure inks used in the gravure printing, toluene-based inks have been conventionally used from the viewpoint of improving drying properties upon printing and upon after-processing, printing stability, etc. In recent years, from the viewpoint of improving working environments, etc., there have been used non-toluene-based oil inks having a reduced content of volatile organic compounds (VOC). However, the non-toluene inks have still failed to achieve sufficient reduction of VOC or $CO_2$, and therefore have posed problems from the standpoint of disaster prevention.

For this reason, there is an increasing demand for safe and secure aqueous gravure inks having a less burden on the environments.

JP 10-158564A (Patent Literature 1) discloses an aqueous printing ink composition, as an ink composition that has good leveling properties and is excellent in dot reproducibility, etc., which contains a pigment and an aqueous binder resin varnish and further contains a specific water-dispersible dimethyl polysiloxane alkyleneoxide adduct in an amount of 0.005 to 5% by weight. In Examples of the Patent Literature 1, it is described that an ink containing 2% by mass of isopropanol is used for printing on a resin film.

JP 2002-188029A (Patent Literature 2) discloses a water-soluble printing ink composition, as an ink composition that is capable of performing good printing on a resin film, which contains 1 to 10% by weight of an organic solvent such as glycol ethers, etc. In Examples of the Patent Literature 2, it is described that in order to prepare a base ink containing a modified silicone-based defoaming agent and control viscosity of the ink composition, the base ink was diluted with a mixed solvent (containing water, ethanol and isopropanol at a mixing ratio of water/ethanol/isopropanol of 20 parts/70 parts/10 parts), and the resulting ink was used for printing on a film.

JP 2018-83938A (Patent Literature 3) discloses an aqueous gravure ink, as an ink that has a less burden on the environments and is capable of realizing high-definition printing owing to excellent wet-spreadability (leveling properties), which contains a pigment, a polymer, a water-soluble organic solvent, a surfactant and water, in which the water-soluble organic solvent contains a glycol ether having a boiling point of 100 to 260° C.; a content of the glycol ether in the ink is 1 to 10% by mass; a total content of the water-soluble organic solvent in the ink is not more than 15% by mass; the surfactant contains an acetylene glycol-based surfactant; and a content of water in the ink is 50 to 70% by mass. In Comparative Example 1 of the Patent Literature 3, it is described that the ink using a polyether-modified silicone-based surfactant "KF-6011" [[(a+b)/(m/n)]=4.64] suffered from color unevenness or mottling.

In addition, in the market of gravure inks, there is an increasing tendency of imparting quick drying properties to the inks, and drying properties of the inks are therefore one important index. If the inks are deteriorated in drying properties, when stacking printed materials on each other, there tends to occur such a "set-off" problem that the ink on one printed material is transferred to the other printed material.

The occurrence of the "set-off" of the ink causes considerable deterioration in commercial value of the printed material, and it is therefore necessary that the printed ink is allowed to stand for a long period of time after the printing to dry the ink until any "set-off" of the ink is no longer caused even when being rubbed. Thus, if the ink is deteriorated in drying properties, the time of allowing the printed ink to stand for drying tends to be prolonged, so that the working efficiency upon the printing tends to be deteriorated.

For this reason, there have been proposed printing papers that are capable of improving drying properties of inks, etc., or aqueous coating agents suitably used as an aqueous overprint varnish, etc.

SUMMARY OF THE INVENTION

The present invention relates to an aqueous gravure ink containing a pigment, a water-soluble organic solvent, a surfactant and water, in which:
the water-soluble organic solvent contains a glycol ether having a boiling point of not lower than 100° C. and not higher than 260° C.;
the surfactant contains a silicone-based surfactant containing a specific constitutional unit represented by the below-mentioned general formula (1);
a content of the water-soluble organic solvent in the ink is not less than 1% by mass and not more than 10% by mass; and
a content of water in the ink is not less than 50% by mass and not more than 80% by mass.

DETAILED DESCRIPTION OF THE INVENTION

The inks described in the Patent Literatures 1 and 2 have a reduced VOC content as compared to solvent-based inks. However, these inks still contain a low-boiling point solvent such as isopropanol, etc., which may serve as a source of generation of VOC. It has been therefore required that the content of VOC in these inks is further reduced.

However, the aqueous inks using no organic solvent or the inks described in the Patent Literature 3, etc., in which the organic solvent is replaced with a high-boiling point solvent that hardly acts as a source of generation of VOC, these inks aiming at reduction in VOC content therein, still tend to pose such a problem that when the inks are printed on a low-water absorbing printing substrate such as a resin film, etc., the resulting printed characters or images are deteriorated in optical density owing to poor wet-spreadability of the inks over the printing substrate, or the inks after being printed are deteriorated in drying properties, etc.

As described above, there has not been conventionally known such an aqueous gravure ink that is capable of satisfying optical density and drying properties when printed on a low-water absorbing printing substrate such as a resin film, etc.

The present invention relates to an aqueous gravure ink that has a less burden on the environments, and is excellent in optical density and drying properties even when printed on a low-water absorbing printing substrate such as a resin film, etc.

The present inventors have found that the aforementioned conventional problems can be solved by an aqueous gravure ink having a large water content which contains a pigment, a water-soluble organic solvent, a surfactant and water, in which the water-soluble organic solvent contains a glycol ether having a specific boiling point; and the surfactant contains a specific amount of a specific silicone-based surfactant.

That is, the present invention relates to an aqueous gravure ink containing a pigment, a water-soluble organic solvent, a surfactant and water, in which:
the water-soluble organic solvent contains a glycol ether having a boiling point of not lower than 100° C. and not higher than 260° C.;
the surfactant contains a silicone-based surfactant containing a constitutional unit represented by the following general formula (1);
a content of the water-soluble organic solvent in the ink is not less than 1% by mass and not more than 10% by mass; and
a content of water in the ink is not less than 50% by mass and not more than 80% by mass.

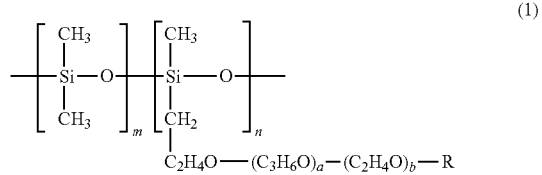

(1)

wherein m and n are numbers of respective structural units; a is an integer of not less than 0 and not more than 40; b is an integer of not less than 1 and not more than 40; R is a hydrogen atom or an alkyl group; and a ratio of $[(a+b)/(m/n)]$ is not less than 1.60 and not more than 4.5.

Incidentally, the respective structural units in the numbers of m, n, a and b may be in the form of either a block copolymer or a random copolymer.

In accordance with the present invention, it is possible to provide an aqueous gravure ink that has a less burden on the environments, and is excellent in optical density and drying properties.

[Aqueous Gravure Ink]

The aqueous gravure ink of the present invention is an aqueous gravure ink that contains a pigment, a water-soluble organic solvent, a surfactant and water (hereinafter also referred to merely as a "gravure ink" or an "ink"), in which:
the water-soluble organic solvent contains a glycol ether having a boiling point of not lower than 100° C. and not higher than 260° C.;
the surfactant contains a silicone-based surfactant containing a constitutional unit represented by the aforementioned general formula (1):
a content of the water-soluble organic solvent in the ink is not less than 1% by mass and not more than 10% by mass; and
a content of water in the ink is not less than 50% by mass and not more than 80% by mass.

The contents of the respective components in the aqueous gravure ink as mentioned below represent contents of these components in the aqueous gravure ink used when performing the gravure printing. In the gravure ink of the present invention, the contents of the respective components in the gravure ink prepared may be controlled to those used upon the printing, and the thus prepared ink may be directly used for the printing. Alternatively, a previously prepared base ink may be diluted with water, etc., upon printing to control the contents of the respective components therein to those contents used for the printing.

The aqueous gravure ink of the present invention has a less burden on the environments and is excellent in optical density and drying properties even when printed on a low-water absorbing printing substrate such as a resin film, etc., and is therefore capable of providing a high-quality printed material. The reason why the aforementioned advantageous effects can be attained by the present invention is considered as follows, though it is not clearly determined yet.

The aqueous gravure ink of the present invention contains the water-soluble organic solvent containing the glycol ether having a boiling point of not lower than 100° C. and not higher than 260° C. in an amount of not less than 1% by mass and not more than 10% by mass, and also contains water in an amount of not less than 50% by mass and not more than 80% by mass. For this reason, it is considered that the aqueous gravure ink can be prevented from being dried out in cells of a gravure printing plate, and therefore can maintain a high transfer rate to a printing substrate. In addition, since the aqueous gravure ink of the present invention contains not only the glycol ether but also the specific silicone-based surfactant in the system having a large water content, it is possible to maintain good wettability of the ink to the printing substrate and suppress occurrence of convention current in the ink even when water contained in the ink transferred to the printing substrate is evaporated to increase a concentration of the glycol ether in the ink, so that the ink can be prevented from suffering from deterioration in wet spreadability (hereinafter also referred to as "leveling properties") of the ink over the printing substrate. As a result, it is considered that the aqueous gravure ink is excellent in optical density and drying properties, and is therefore capable of providing a printed material having a high quality.

Moreover, it is also considered that since the content of the water-soluble organic solvent in the ink is not more than 10% by mass, and the water-soluble organic solvent contains the glycol ether having a boiling point of not lower than 100° C. and not higher than 260° C., the water-soluble organic solvent tends to hardly act as a source of generation of VOC, and therefore the resulting ink has a reduced burden on the environments.

<Pigment>

The pigment used in the ink of the present invention may be either an inorganic pigment and an organic pigment.

Examples of the inorganic pigment include carbon blacks, metal oxides and the like. The carbon blacks are preferably used for black inks. Examples of the carbon blacks include furnace blacks, thermal lamp blacks, acetylene blacks, channel blacks and the like. As a pigment for white inks, there may be used metal oxides such as titanium dioxide, zinc oxide, silica, alumina, magnesium oxide, etc. These inorganic pigments may be subjected to surface treatments with conventionally known hydrophobilizing agents such as a titanium coupling agent, a silane coupling agent, a higher fatty acid metal salt, etc.

Examples of the organic pigment include azo pigments such as azo lake pigments, insoluble monoazo pigments, insoluble disazo pigments, chelate azo pigments, etc.; polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments, threne pigments, etc.; and the like.

The hue of the pigment used in the present invention is not particularly limited. In chromatic inks, there may be used any chromatic pigment having a yellow color, a magenta color, a cyan color, a red color, a blue color, an orange color, a green color, etc.

Specific examples of the preferred organic pigments include at least one pigment selected from the group consisting of C.I. Pigment Yellow 13, 17, 74, 83, 93, 97, 109, 110, 120, 128, 139, 151, 154, 155, 174 and 180; C.I. Pigment Red 48, 57:1, 122, 146, 150, 176, 184, 185, 188, 202 and 254; C.I. Pigment Orange; C.I. Pigment Violet 19 and 23; C.I. Pigment Blue 15, 15:1, 15:2, 15:3, 15:4, 16 and 60; C.I. Pigment Green 7 and 36; and the like.

The pigment used herein is in the form of at least one pigment selected from the group consisting of a self-dispersible pigment, and pigment particles formed by dispersing a pigment with a polymer, and preferably in the form of polymer particles containing a pigment (hereinafter also referred to merely as "pigment-containing polymer particles").

Incidentally, the self-dispersible pigment as used herein means a pigment onto a surface of which at least one hydrophilic group selected from the group consisting of an anionic hydrophilic group and a cationic hydrophilic group is bonded either directly or through the other atom group to thereby render the pigment dispersible in a water-based medium without using a surfactant or a polymer.

<Polymer>

The ink of the present invention preferably contains a polymer as a pigment dispersing agent and/or a fixing agent for fixing the ink on a printing substrate. As the polymer, there may be used either a water-soluble polymer or a water-insoluble polymer. Of these polymers, preferred is the water-insoluble polymer.

The water-soluble polymer as used herein means such a polymer that when the polymer is dried to a constant weight at 105° C. for 2 hours and then dissolved in 100 g of water at 25° C. until reaching a saturation concentration thereof, the solubility in water of the polymer is not less than 10 g.

The water-insoluble polymer as used herein means such a polymer that when the polymer is dried to a constant weight at 105° C. for 2 hours and then dissolved in 100 g of water at 25° C. until reaching a saturation concentration thereof, the solubility in water of the polymer is less than 10 g. The solubility in water of the water-insoluble polymer is preferably not more than 5 g and more preferably not more than 1 g. In the case where the water-insoluble polymer is in the form of an anionic polymer, the aforementioned solubility means a solubility of the polymer whose anionic groups are neutralized completely (i.e., 100%) with sodium hydroxide.

Examples of the polymer used in the present invention include polyesters, polyurethanes, vinyl-based polymers and the like. As the polymer, from the viewpoint of improving optical density and drying properties of the resulting ink, preferred are vinyl-based polymers obtained by addition-polymerizing a vinyl monomer such as a vinyl compound, a vinylidene compound, a vinylene compound, etc. In addition, as the polymer, there may also be used a crosslinked polymer obtained by crosslinking the polymer with a crosslinking agent.

The polymer used in the present invention is preferably used in the form of pigment-containing polymer particles or pigment-free polymer particles B by dispersing the polymer particles in the gravure ink. In the following, the polymer constituting the pigment-containing polymer particles is also referred to as a "polymer a", and the polymer constituting the pigment-free polymer particles B is also referred to as a "polymer b".

The polymer a may be used as a pigment dispersing polymer having a capability of dispersing the pigment, whereas the polymer b may be used as a fixing aid polymer for fixing the ink on a printing substrate.

The polymer a may have a composition that is either identical to or different from that of the polymer b. In addition, the polymers a and b may be identical to each other inclusive of their composition, but may be different from each other merely as to presence or non-presence of the pigment therein.

In the case where the ink contains both of the pigment-containing polymer particles and the polymer particles B, the content of the polymer in the ink means a total content of the polymer a and the polymer b.

The content of the polymer (a total content of the polymer a and the polymer b) in the gravure ink is preferably not less than 3% by mass, more preferably not less than 5% by mass and even more preferably not less than 7% by mass, and is also preferably not more than 30% by mass, more preferably not more than 25% by mass and even more preferably not more than 20% by mass, from the viewpoint of improving optical density and drying properties of the resulting ink.

[Polymer a]

The polymer a is a polymer having a capability of dispersing the pigment. Examples of the polymer a include polyesters, polyurethanes, vinyl-based polymers and the like. Among these polymers, from the viewpoint of improving optical density and drying properties of the resulting ink, preferred are the vinyl-based polymers obtained by addition-polymerizing a vinyl monomer.

The vinyl-based polymer preferably contains a constitutional unit derived from (a1) an ionic monomer and a constitutional unit derived from (a2) a hydrophobic monomer.

The ionic monomer (a1) is preferably an anionic monomer. Examples of the anionic monomer include carboxylic acid monomers, sulfonic acid monomers and the like. Among these monomers, preferred are carboxylic acid monomers, more preferred is at least one monomer selected from the group consisting of acrylic acid and methacrylic acid.

Examples of the hydrophobic monomer (a2) include alkyl (meth)acrylates, aromatic group-containing monomers, macromonomers containing a polymerizable functional group at one terminal end thereof, and the like.

The alkyl (meth)acrylates are preferably those alkyl (meth)acrylates containing an alkyl group having not less than 6 and not more than 18 carbon atoms. Examples of the alkyl (meth)acrylates include methyl (meth)acrylate, ethyl (meth)acrylate, (iso)propyl (meth)acrylate, (iso- or tert-) butyl (meth)acrylate, cyclohexyl (meth)acrylate, 2-ethylhexyl (meth)acrylate, (iso)octyl (meth)acrylate and the like.

As the aromatic group-containing monomers, preferred are vinyl-based monomers containing an aromatic group having not less than 6 and not more than 22 carbon atoms, and more preferred are styrene-based monomers, aromatic group-containing (meth)acrylates and the like. Examples of the preferred styrene-based monomers include styrene, 2-methyl styrene, α-methyl styrene, vinyl toluene, divinyl benzene and the like. Examples of the preferred aromatic group-containing (meth)acrylates include benzyl (meth) acrylate and the like.

The polymer a may further contain a constitutional unit derived from (a3) a nonionic monomer. The nonionic monomer is in the form of a monomer having a high affinity to water or a water-soluble organic solvent. As the nonionic monomer (a3), preferred are a polyalkylene glycol (meth) acrylate and an alkoxy polyalkylene glycol (meth)acrylate, and more preferred is methoxy polyethylene glycol (n=1 to 30) (meth)acrylate. Specific examples of commercially available products of the nonionic monomer include "NK ESTER M" series products available from Shin-Nakamura Chemical Co., Ltd.; "BLEMMER PE" series products, "BLEMMER PME" series products, "BLEMMER 50PEP" series products, "BLEMMER 50POEP" series products, etc., all available from NOF Corporation; and the like.

(Contents of Respective Constitutional Units in Polymer a)

The contents of the constitutional units derived from the components (a1) to (a3) in the polymer a are as follows from the viewpoint of improving dispersion stability of the resulting ink.

The content of the component (a1) is preferably not less than 5% by mass, more preferably not less than 10% by mass and even more preferably not less than 15% by mass, and is also preferably not more than 45% by mass, more preferably not more than 40% by mass and even more preferably not more than 35% by mass.

The content of the component (a2) is preferably not less than 30% by mass, more preferably not less than 40% by mass and even more preferably not less than 50% by mass, and is also preferably not more than 95% by mass, more preferably not more than 90% by mass and even more preferably not more than 85% by mass.

The content of the component (a3) is not more than 0% by mass. In the case of using the component (a3), the content of the component (a3) is preferably not less than 1% by mass, and is also preferably not more than 20% by mass, more preferably not more than 15% by mass and even more preferably not more than 10% by mass.

(Production of Polymer a)

The aforementioned polymer a may be produced by copolymerizing a monomer mixture containing the ionic monomer (a1), the hydrophobic monomer (a2), etc., by a known solution polymerization method, etc.

The weight-average molecular weight of the polymer a is preferably not less than 5,000, more preferably not less than 10,000 and even more preferably not less than 13,000, and is also preferably not more than 200,000, more preferably not more than 100,000 and even more preferably not more than 50,000, from the viewpoint of improving dispersion stability, optical density and drying properties of the resulting ink.

The acid value of the polymer a is preferably not less than 100 mgKOH/g, more preferably not less than 150 mgKOH/g and even more preferably not less than 200 mgKOH/g, and is also preferably not more than 350 mgKOH/g, more preferably not more than 300 mgKOH/g and even more preferably not more than 270 mgKOH/g, from the viewpoint of improving dispersibility of the pigment and adsorptivity of the polymer.

Meanwhile, the weight-average molecular weight and the acid value may be measured by the methods described in Examples below.

(Production of Pigment-Containing Polymer Particles)

The pigment-containing polymer particles are in the form of particles formed by adsorbing the polymer a onto the surface of the pigment, so that the pigment can be stably dispersed in the ink.

The pigment-containing polymer particles can be efficiently produced in the form of a dispersion thereof by a process including the following step I, and may also be produced by a process further including the following step II. In the case where the polymer is crosslinked with a crosslinking agent, the pigment-containing polymer particles are preferably produced by a process further including the following step III.

Step I; subjecting a mixture containing the polymer a, an organic solvent and the pigment, if required together with a neutralizing agent, a surfactant, etc., to dispersion treatment to thereby obtain a dispersion of the pigment-containing polymer particles;

Step II; removing the organic solvent from the dispersion obtained in the step I to thereby obtain a water dispersion of the pigment-containing polymer particles; and Step III; mixing the dispersion obtained in the step I or the water dispersion obtained in the step II with a crosslinking agent to subject the dispersion to crosslinking treatment, thereby obtaining a water dispersion of pigment-containing crosslinked polymer particles.

(Step I)

In the case where the polymer a is an anionic polymer, anionic groups contained in the polymer may be neutralized using a neutralizing agent. When using the neutralizing agent, the anionic groups contained in the polymer are preferably neutralized such that the pH value of the dispersion obtained by the neutralization falls within the range of not less than 7 and not more than 11. Examples of the neutralizing agent include bases such as lithium hydroxide, sodium hydroxide, potassium hydroxide, ammonia, various amines and the like. In addition, the polymer may be previously neutralized.

The neutralization degree of the anionic groups contained in the polymer a is preferably not less than 10 mol %, more preferably not less than 20 mol % and even more preferably not less than 30 mol % on the basis of the anionic groups, and is also preferably less than 100 mol %, more preferably not more than 90 mol %, even more preferably not more than 80 mol % and further even more preferably not more than 75 mol % on the basis of the anionic groups, from the viewpoint of improving dispersion stability of the resulting ink.

In the case where the polymer a contains the anionic groups, the neutralization degree of the anionic groups contained in the polymer a may be determined as an equivalent amount of the neutralizing agent used on the basis of the anionic groups contained in the polymer a, and calculated according to the following formula. When the equivalent amount of the neutralizing agent used is not more than 100 mol %, the equivalent amount of the neutralizing agent used has the same meaning as the neutralization degree of the anionic groups to be neutralized. On the other hand, when the equivalent amount of the neutralizing agent used exceeds 100 mol %, it means that the neutralizing agent is present in an excessively large amount relative to the acid groups contained in the polymer dispersant (a), and in such a case, the neutralization degree of the polymer dispersant (a) is regarded as being 100 mol %.

Equivalent amount (mol %) of neutralizing agent used=[{mass (g) of neutralizing agent added/ equivalent amount of neutralizing agent}/ [{weighted mean acid value (mgKOH/g) of polymer dispersant (a)×mass (g) of polymer dispersant (a)}/(56×1000)]]×100.

In the step I, the method of dispersing the mixture is not particularly limited. The pigment-containing polymer particles may be atomized into fine particles having a desired average particle size only by substantial dispersion treatment. However, it is preferred that the mixture is first subjected to preliminary dispersion treatment, and then to the substantial dispersion treatment by applying a shear stress thereto so as to control the average particle size of the obtained pigment-containing polymer particles to a desired value.

As the preferred dispersing method, there may be mentioned such a method in which after subjecting the mixture to the preliminary dispersion treatment using a disper blade, etc., the resulting dispersion is further subjected to high-pressure dispersion treatment. The term "high-pressure dispersion" as used herein means that the dispersion treatment is conducted under a pressure of not less than 20 MPa.

(Step II)

In the step II, the removal of the organic solvent from the obtained dispersion may be conducted by conventionally known methods. The organic solvent is preferably substantially completely removed from the thus obtained water dispersion containing the pigment-containing polymer particles. However, the residual organic solvent may be present in the water dispersion unless the objects and advantageous effects of the present invention are adversely affected by the residual organic solvent. The content of the residual organic solvent in the water dispersion is preferably not more than 0.1% by mass and more preferably not more than 0.01% by mass.

The removal of the organic solvent from the dispersion is preferably conducted such that the concentration of non-volatile components (solid components) in the dispersion obtained after removing the organic solvent therefrom is preferably not less than 15% by mass and more preferably not less than 20% by mass, and is also preferably not more than 50% by mass, more preferably not more than 40% by mass and even more preferably not more than 35% by mass.

(Step III)

The step III is the step of mixing the dispersion obtained in the step I or the water dispersion obtained in the step II with a crosslinking agent to subject the dispersion to crosslinking treatment, thereby obtaining a water dispersion of pigment-containing crosslinked polymer particles.

In the case where the polymer a is the anionic polymer containing the anionic groups, the crosslinking agent is preferably in the form of a compound containing a functional group that is capable of reacting with the anionic groups, more preferably a compound containing the two or more functional groups in a molecule thereof, and even more preferably a compound containing the not less than 2 and not more than 6 functional groups in a molecule thereof.

The crosslinking gent is preferably a water-insoluble polyfunctional epoxy compound containing two or more epoxy groups in a molecule thereof. The crosslinking gent is more preferably a compound containing two or more glycidyl ether groups in a molecule thereof, and even more preferably a polyglycidyl ether compound of a polyhydric alcohol containing not less than 3 and not more than 8 hydrocarbon groups in a molecule thereof.

The "water-insoluble" of the crosslinking agent as used herein means that when the crosslinking agent is dissolved in 100 g of ion-exchanged water at 25° C. until reaching a saturation concentration thereof, the solubility in water of the crosslinking agent is less than 50 g. The solubility in water of the water-insoluble crosslinking agent is preferably not more than 40 g and more preferably not more than 35 g.

From the viewpoint of efficiently conducting the crosslinking reaction of the polymer in a water-based medium, the water solubility rate of the crosslinking agent is preferably less than 50% by mass, more preferably not more than 40% by mass and even more preferably not more than 35% by mass. The "water solubility rate" of the crosslinking agent as used herein means a rate (% by mass) of dissolution of the crosslinking agent as measured by dissolving 10 parts by mass of the crosslinking agent in 90 parts by mass of water at room temperature (25° C.).

The molecular weight of the crosslinking agent is preferably not less than 120, more preferably not less than 150 and even more preferably not less than 200, and is also preferably not more than 2000, more preferably not more than 1500 and even more preferably not more than 1000, from the viewpoint of facilitating the crosslinking reaction.

The epoxy equivalent (g/eq) of the crosslinking agent is preferably not less than 90, more preferably not less than 100 and even more preferably not less than 110, and is also preferably not more than 300, more preferably not more than 200 and even more preferably not more than 150.

Meanwhile, the epoxy equivalent may be measured by the method described in Examples below.

Specific examples of the crosslinking agent include polyglycidyl ethers such as polypropylene glycol diglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether, 1,6-hexanediol diglycidyl ether, hydrogenated bisphenol A-type diglycidyl ethers, etc., and the like. Of these crosslinking agents, preferred is at least one compound selected from the group consisting of polypropylene glycol diglycidyl ether (water solubility rate: 31% by mass), trimethylolpropane polyglycidyl ether (water solubility rate: 27% by mass) and pentaerythritol polyglycidyl ether (water solubility rate: 0% by mass).

Examples of commercially available products of the water-insoluble polyfunctional epoxy compound include "DENACOL EX" series products available from Nagase ChemteX Corp., and "EPIOL BE" series products and "EPIOL B" series products both available from NOF Corporation, and the like.

The crosslinking rate of acid components in the polymer a is preferably not less than 5 mol %, more preferably not less than 10 mol % and even more preferably not less than 20 mol %, and is also preferably not more than 80 mol %, more preferably not more than 70 mol % and even more preferably not more than 60 mol %, from the viewpoint of improving storage stability of the resulting ink.

The content of the polymer a in the ink is preferably not less than 0.1% by mass, more preferably not less than 0.2% by mass and even more preferably not less than 0.3% by mass, and is also preferably not more than 10% by mass, more preferably not more than 5% by mass and even more preferably not more than 2% by mass, from the viewpoint of improving fixing properties of the resulting ink.

The mass ratio of the polymer a to the pigment [polymer a/pigment] in the ink is preferably from 0.2/99.8 to 70/30, more preferably from 0.5/99.5 to 60/40 and even more preferably from 1/99 to 50/50, from the viewpoint of improving storage stability of the resulting ink.

Specific examples of commercially available products of the vinyl-based polymers include polyacrylic acids such as "ARON AC-10SL" available from Toagosei Co., Ltd., etc., and styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc., and the like.

(Pigment-Free Polymer Particles B)

The gravure ink preferably contains pigment-free polymer particles B (polymer particles B) from the viewpoint of improving fixing properties of the ink on a printing substrate. The polymer particles B contain no pigment and are in the form of water-insoluble polymer particles formed of a polymer solely.

Examples of a polymer b constituting the polymer particles B include acrylic resins, styrene-based resins, urethane-based resins, polyester-based resins, styrene-acrylic resins, butadiene-based resins, vinyl chloride-based resins, and the like. Among these resins, from the viewpoint of improving optical density and drying properties of the resulting ink, preferred are acrylic resins and vinyl chloride-acrylic resins, and also preferred is a combination of the acrylic resin and the vinyl chloride-acrylic resin.

The polymer particles B are preferably used in the form of a water dispersion prepared by dispersing the polymer particles B in water. The polymer particles B used herein may be either an appropriately synthesized product or a commercially available product.

[Polymer b]

The aforementioned acrylic resin is preferably a water-insoluble vinyl-based polymer that is produced by copolymerizing a monomer mixture B containing (b1) an ionic monomer and (b2) a hydrophobic monomer.

Examples of the component (b1) include the same monomers as described above as to the aforementioned component (a1). Among these monomers, from the viewpoint of improving fixing properties of the resulting ink, preferred are anionic monomers, more preferred are carboxylic acid monomers, and even more preferred is at least one monomer selected from the group consisting of acrylic acid and methacrylic acid.

Examples of the component (b2) include the same alkyl (meth)acrylates, aromatic group-containing monomers and macromonomers as described above as to the aforementioned component (a2), etc. Among these monomers, preferred are alkyl (meth)acrylates; more preferred are those alkyl (meth)acrylates containing an alkyl group having not less than 1 and not more than 22 carbon atoms and preferably not less than 1 and not more than 10 carbon atoms; even more preferred are those compounds illustrated above; and further even more preferred is a combination of methyl (meth)acrylate and 2-ethylhexyl (meth)acrylate.

(Contents of Respective Constitutional Units in Polymer b)

The contents of the respective constitutional units derived from the components (b-1) and (b-2) in the polymer b are as follows from the viewpoint of improving fixing properties of the ink onto a printing substrate.

The content of the component (b1) is preferably not less than 0.5% by mass, more preferably not less than 1% by mass and even more preferably not less than 1.5% by mass, and is also preferably less than 40% by mass, more preferably less than 30% by mass and even more preferably less than 20% by mass.

The content of the component (b-2) is preferably not less than 60% by mass, more preferably not less than 70% by mass and even more preferably not less than 80% by mass, and is also preferably less than 99.5% by mass, more preferably less than 99% by mass and even more preferably less than 98.5% by mass.

The polymer b may be produced by copolymerizing a monomer mixture containing the ionic monomer (b1), the hydrophobic monomer (b2) and the like by a conventionally known solution polymerization method, etc.

Examples of commercially available products of the dispersion of the polymer particles B include dispersions of acrylic resins such as "Neocryl A1127" (anionic self-crosslinkable water-based acrylic resin) available from DSM NeoResins, Inc., "JONCRYL 390" available from BASF Japan, Ltd., etc.; urethane-based resins such as "WBR-2018" and "WBR-2000U" both available from Taisei Fine Chemical Co., Ltd., etc.; styrene-butadiene resins such as "SR-100" and "SR-102" both available from Nippon A & L Inc., etc.; styrene-acrylic resins such as "JONCRYL 7100", "JONCRYL 7600", "JONCRYL 734", "JONCRYL 780", "JONCRYL 537J", "JONCRYL 538J", "JONCRYL PDX-7164" and "JONCRYL PDX-7775" all available from BASF Japan, Ltd., etc.; vinyl chloride-acrylic resins such as "VINYBLAN 700" and "VINYBLAN 701" both available from Nissin Chemical Co., Ltd., etc.; and the like.

The weight-average molecular weight of the polymer b is preferably not less than 100,000, more preferably not less than 200,000 and even more preferably not less than 300,000, and is also preferably not more than 2,500,000, more preferably not more than 1,000,000 and even more preferably not more than 600,000, from the viewpoint of improving fixing properties of the resulting ink.

The acid value of the polymer b is preferably not less than 1 mgKOH/g, more preferably not less than 3 mgKOH/g and even more preferably not less than 5 mgKOH/g, and is also preferably not more than 70 mgKOH/g, more preferably not more than 65 mgKOH/g and even more preferably not more than 60 mgKOH/g, from the viewpoint of improving fixing properties of the resulting ink.

Meanwhile, the weight-average molecular weight and the acid value of the polymer b may be measured by the methods described in Examples below.

The content of the polymer particles B in the ink is preferably not less than 1% by mass, more preferably not less than 2% by mass and even more preferably not less than 3% by mass, and is also preferably not more than 30% by mass, more preferably not more than 20% by mass and even more preferably not more than 15% by mass, from the viewpoint of improving fixing properties of the resulting ink.

The average particle size of the polymer particles B in the dispersion or the ink is preferably not less than 10 nm, more preferably not less than 20 nm and even more preferably not less than 30 nm, and is also preferably not more than 300 nm, more preferably not more than 200 nm and even more preferably not more than 150 nm, from the viewpoint of improving stability of the resulting ink.

Meanwhile, the average particle size of the polymer particles B may be measured by the method described in Examples below.

<Water-Soluble Organic Solvent>

The water-soluble organic solvent used in the present invention may be present either in a liquid state or in a solid state at an ordinary temperature (25° C.). The water-soluble organic solvent as used herein means an organic solvent having a solubility in water of not less than 10 mL as measured by dissolving the organic solvent in 100 mL of water at 25° C.

The water-soluble organic solvent contains a glycol ether having a boiling point of not lower than 100° C. and not higher than 260° C. from the viewpoint of improving drying properties of the resulting ink.

The molecular weight of the aforementioned glycol ether is preferably not less than 70, more preferably not less than 80 and even more preferably not less than 100, and is also preferably not more than 200, more preferably not more than 190 and even more preferably not more than 180.

The boiling point of the aforementioned glycol ether is preferably not lower than 110° C., more preferably not lower than 115° C., even more preferably not lower than 120° C. and further even more preferably not lower than 130° C., and is also preferably not higher than 240° C., more preferably not higher than 230° C. and even more preferably not higher than 220° C., from the viewpoint of improving leveling properties of the resulting ink. More specifically, the boiling point of the glycol ether is preferably not lower than 110° C. and not higher than 240° C., more preferably not lower than 115° C. and not higher than 230° C., even more preferably not lower than 120° C. and not higher than 220° C., and further even more preferably not lower than 130° C. and not higher than 220° C.

As the aforementioned glycol ether, from the viewpoint of improving drying properties of the resulting ink, preferred is at least one compound selected from the group consisting of an alkylene glycol monoalkyl ether and an alkylene glycol dialkyl ether, and more preferred is an alkylene glycol monoalkyl ether.

The number of carbon atoms of an alkyl group contained in the aforementioned glycol ether is preferably not less than 1, more preferably not less than 2 and even more preferably not less than 3 from the viewpoint of improving leveling properties of the resulting ink, and is also preferably not more than 8, more preferably not more than 6 and even more preferably not more than 4 from the viewpoint of improving drying properties of the resulting ink. As the alkylene glycol of the aforementioned glycol ether, from the viewpoint of improving drying properties of the resulting ink, preferred is at least one compound selected from the group consisting of ethylene glycol and propylene glycol, and more preferred is ethylene glycol. The polymerization degree of the alkylene glycol of the aforementioned glycol ether is preferably not less than 1 and not more than 3, more preferably 1 or 2, and even more preferably 2 from the viewpoint of improving leveling properties of the resulting ink.

Totally taking the aforementioned items into consideration, as the glycol ether, preferred is at least one compound selected from the group consisting of an alkylene glycol monoalkyl ether and an alkylene glycol dialkyl ether whose alkyl group has not less than 1 and not more than 8 carbon atoms and whose alkylene glycol is at least one compound selected from the group consisting of ethylene glycol and propylene glycol having a polymerization degree of not less than 1 and not more than 3. Of these glycol ethers, more preferred is an alkylene glycol monoalkyl ether whose alkyl group has not less than 2 and not more than 6 carbon atoms and whose alkylene glycol is at least one compound selected from the group consisting of ethylene glycol and propylene glycol having a polymerization degree of 1 or 2, and even more preferred is a diethylene glycol monoalkyl ether whose alkyl group has not less than 3 and not more than 4 carbon atoms.

Specific examples of the glycol ether include ethylene glycol monomethyl ether, ethylene glycol monoisopropyl ether, ethylene glycol monobutyl ether, diethylene glycol monomethyl ether, diethylene glycol monoisopropyl ether, diethylene glycol monobutyl ether, diethylene glycol monoisobutyl ether, dipropylene glycol monomethyl ether, triethylene glycol monobutyl ether, tripropylene glycol monomethyl ether, diethylene glycol dimethyl ether, diethylene glycol methyl ethyl ether, diethylene glycol diethyl ether, and the like.

Of these glycol ethers, preferred is at least one compound selected from the group consisting of ethylene glycol monomethyl ether (MG; boiling point: 125° C.), ethylene glycol monoisopropyl ether (iPG; boiling point: 142° C.), ethylene glycol monobutyl ether, diethylene glycol monomethyl ether (MDG; boiling point: 194° C.), diethylene glycol monoisopropyl ether (iPDG; boiling point: 207° C.), diethylene glycol monobutyl ether (BDG; boiling point: 231° C.), diethylene glycol monoisobutyl ether (iBDG; boiling point: 220° C.) and triethylene glycol monobutyl ether (BTG; boiling point: 278° C.), and more preferred is at least one compound selected from the group consisting of ethylene glycol monomethyl ether, ethylene glycol monoisopropyl ether, ethylene glycol monobutyl ether and diethylene glycol monoisobutyl ether (iBDG; boiling point: 220° C.).

The water-soluble organic solvent may further contain the other water-soluble organic solvent(s) in addition to the aforementioned glycol ether. Examples of the other water-soluble organic solvent(s) include alcohols, divalent or higher-valent polyhydric alcohols such as glycols, pyrrolidones such as N-methyl-2-pyrrolidone, 2-pyrrolidone, etc., alkanol amines, and the like. Of these other water-soluble organic solvents, preferred are glycols from the viewpoint of improving leveling properties of the resulting ink.

The preferred range of the boiling points of the aforementioned glycols is the same as the preferred rang of the boiling points of the aforementioned glycol ethers.

Examples of the glycols include 1,2-alkanediols having not less than 2 and not more than 10 carbon atoms, such as ethylene glycol, propylene glycol, 1,2-butanediol, 1,2-pentanediol, 1,2-hexanediol, 1,2-octanediol, 1,2-decanediol, etc.; 1,3-alkanediols having not less than 3 and not more than 8 carbon atoms, such as 1,3-propanediol, 2-methyl-1,3-propanediol, 3-methyl-1,3-butanediol, 2-ethyl-1,3-hexanediol, etc.; polyalkylene glycols such as dipropylene glycol, diethylene glycol, etc.; and the like. These glycols may be used alone or in combination of any two or more thereof. Of these glycols contained in water-soluble organic solvent, from the viewpoint of improving drying properties and leveling properties of the resulting ink, preferred are 1,2-alkanediols having not less than 2 and not more than 10 carbon atoms; more preferred are 1,2-alkanediols having not less than 2 and not more than 6 carbon atoms; even more preferred are 1,2-alkanediols having not less than 2 and not more than 4 carbon atoms; and further even more preferred is propylene glycol (PG; boiling point: 188° C.).

The ink may also contain a water-soluble organic solvent having a boiling point of lower than 100° C. or higher than 260° C. Examples of the water-soluble organic solvent having a boiling point of lower than 100° C. include monohydric alcohols such as ethanol, isopropyl alcohol, n-propyl alcohol, etc. Examples of the water-soluble organic solvent having a boiling point of higher than 260° C. include triethylene glycol (boiling point: 285° C.), tripropylene glycol (boiling point: 273° C.), glycerin (boiling point: 290° C.), etc.

<Surfactant>
(Silicone-Based Surfactant)

The aqueous gravure ink of the present invention contains a silicone-based surfactant containing a constitutional unit represented by the following general formula (1) from the viewpoint of improving drying properties of the ink.

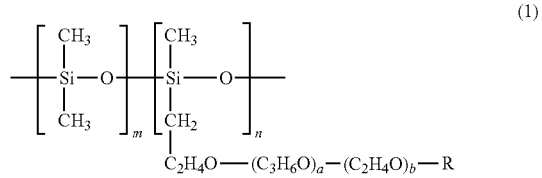

(1)

wherein m and n are numbers of respective structural units; a is an integer of not less than 0 and not more than 40; b is an integer of not less than 1 and not more than 40; R is a hydrogen atom or an alkyl group; and a ratio of [(a+b)/(m/n)] is not less than 1.60 and not more than 4.5.

Incidentally, the respective structural units in the numbers of m, n, a and b may be in the form of either a block copolymer or a random copolymer.

The number m of the silicone structural units containing no polyalkyleneoxide group in the formula (1) is preferably not less than 1, more preferably not less than 2, even more preferably not less than 5 and further even more preferably not less than 10, and is also preferably not more than 200, more preferably not more than 100 and even more preferably not more than 50.

The number n of the silicone structural units containing the polyalkyleneoxide group in the formula (1) is preferably not less than 1, more preferably not less than 2, even more preferably not less than 4 and further even more preferably not less than 6, and is also preferably not more than 100, more preferably not more than 80 and even more preferably not more than 50.

The ratio of the structural unit number m to the structural unit number n (m/n) represents a proportion of the polyalkyleneoxide groups in the silicone-based surfactant, and the larger the number of the polyalkyleneoxide groups becomes, the less the value of the ratio (m/n) is.

The ratio of the structural unit number m to the structural unit number n (m/n) is preferably not less than 1.5, more preferably not less than 1.8 and even more preferably not less than 2.0, and is also preferably not more than 20, more preferably not more than 15 and even more preferably not more than 10, from the viewpoint of improving drying properties of the resulting ink.

The ratio (m/n) may be measured by the method described in Examples below.

More specifically, the ratio (m/n) is determined by a proton nuclear magnetic resonance ($^1$H-NMR) spectroscopy. From the results of the $^1$H-NMR measurement, the peak area value of δ (ppm): 0.3-0.6 is set to 2 (2H: fixed value). The value (area value 3) of protons of the methyl group (CH$_3$) directly bonded to the modified Si element is subtracted from the peak area value of δ (ppm): 0-0.5, and further the obtained value is divided by the value (area value 6) of protons as 2H of the methyl groups (CH$_3$) directly bonded to the unmodified Si element to thereby calculate the ratio [min] between the modified and unmodified Si elements.

In addition, the structural unit number a of the polypropyleneoxide group is calculated by dividing the peak area value of δ=1.0-1.2 by the value of protons as 3H of the methyl groups (CH$_3$) of the propyleneoxide group (PO).

The structural unit number b of the polyethyleneoxide group is calculated from the peak area value of δ=3.0-3.8 as a total peak area value of the methylene group (CH$_2$/2H) directly bonded to an oxygen atom of the propyleneoxide group (EO) or PO, the hydrogens of (CH, CH$_2$) of PO (3H×average molar number of addition of PO), and EO (CH$_2$—CH$_2$/4H×average molar number of addition of EO), and the aforementioned value a.

The value a in the formula (1) is preferably not less than 0, and is also preferably not more than 35, more preferably not more than 25 and even more preferably not more than 15.

The value b in the formula (1) is preferably not less than 1, more preferably not less than 2, even more preferably not less than 5 and further even more preferably not less than 8, and is also preferably not more than 35, more preferably not more than 25, even more preferably not more than 20 and further even more preferably not more than 18. The larger the value b becomes, the higher the hydrophilicity per a polyalkyleneoxide group of the silicone-based surfactant is.

The value (a+b) in the formula (1) is an index for representing a length of the polyalkyleneoxide groups, and it is considered that the value (a+b) has a relationship with an affinity to the glycol ether.

The value (a+b) is preferably not less than 1, more preferably not less than 2, even more preferably not less than 5 and further even more preferably not less than 8, and is also preferably not more than 50, more preferably not more than 40, even more preferably not more than 30, further even more preferably not more than 20 and still further even more preferably not more than 18.

The ratio of [(a+b)/(m/n)] in the formula (1) is an index for representing an affinity to the glycol ether and a hydrophilicity of the silicone-based surfactant, and it is considered that the ratio value contributes to wet-spreadability of the water-based ink containing the glycol ether and the silicone-based surfactant over a printing substrate. Also, it is considered that when the water-based ink has an appropriate wet-spreadability, the resulting printed characters or images can be improved in optical density.

The ratio of [(a+b)/(m/n)] is not less than 1.60, preferably not less than 1.65, more preferably not less than 1.7, even more preferably not less than 1.8 and further even more preferably not less than 2.0, and is also not more than 4.5, preferably not more than 4.4, more preferably not more than 4.3, even more preferably not more than 4.2, further even more preferably not more than 4.1 and still further even more preferably less than 4. More specifically, the ratio of [(a+b)/(m/n)] is preferably not less than 1.65 and not more than 4.4, more preferably not less than 1.7 and not more than 4.3, even more preferably not less than 1.8 and not more than 4.2, further even more preferably not less than 2.0 and not more than 4.1 and still further even more preferably not less than 2.0 and less than 4.

The ratio of [(a+b)/(m/n)] may be measured by the method described in Examples below.

R in the formula (1) is preferably a hydrogen atom or an alkyl group having 1 to 15 carbon atoms, more preferably a hydrogen atom or an alkyl group having 1 to 8 carbon atoms, even more preferably a hydrogen atom or an alkyl group having 1 to 3 carbon atoms, and further even more preferably a methyl group.

As the silicone-based surfactant containing the constitutional unit represented by the general formula (1), there may be mentioned a dimethyl polysiloxane alkyleneoxide containing a constitutional unit represented by the following general formula (2).

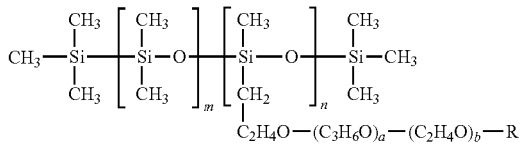

(2)

wherein m, n, a, b and [(a+b)/(m/n)] are the same as those described previously.

Specific examples of commercially available products of the silicone-based surfactant include silicones "KF-642", "KF-643", "KF-644", "KF-355A" and "SAG002" all available from Shin-Etsu Chemical Co., Ltd., "TEGO Wet 240" available from Evonik Japan Co., Ltd., and the like.

(Acetylene Glycol-Based Surfactant)

The ink of the present invention preferably further contains an acetylene glycol-based surfactant as the surfactant from the viewpoint of improving drying properties of the resulting ink.

As the acetylene glycol-based surfactant, from the viewpoint of improving drying properties of the resulting ink, preferred are an acetylene glycol containing not less than 8 and not more than 22 carbon atoms and an ethylene adduct of the acetylene glycol, and more preferred is the acetylene glycol containing not less than 8 and not more than 22 carbon atoms. The number of carbon atoms contained in the aforementioned acetylene glycol is preferably not less than 10 and more preferably not less than 12, and is also preferably not more than 20, more preferably not more than 18 and even more preferably not more than 16. More specifically, from the viewpoint of improving leveling properties of the resulting ink, as the acetylene glycol-based surfactant, there may be mentioned at least one acetylene glycol selected from the group consisting of 2,4,7,9-tetramethyl-5-decyne-4,7-diol, 3,6-dimethyl-4-octyne-3,6-diol and 2,5-dimethyl-3-hexyne-2,5-diol, and an ethyleneoxide adduct of the acetylene glycol. Of these compounds, preferred is 2,4,7,9-tetramethyl-5-decyne-4,7-diol.

The HLB value of the acetylene glycol-based surfactant is preferably not less than 0, more preferably not less than 1, even more preferably not less than 2 and further even more preferably not less than 2.5, and is also preferably not more than 5, more preferably not more than 4.5, even more preferably not more than 4 and further even more preferably not more than 3.5.

These acetylene glycol-based surfactants may be used alone or in combination of any two or more thereof.

The term "HLB" (Hydrophilic-Lipophilic Balance) value as used herein means the value indicating an affinity of the surfactant to water and an oil, and can be calculated according to the following formula by Griffin method.

HLB=20×[(molecular weight of hydrophilic group contained in surfactant)/(molecular weight of surfactant)]

As the hydrophilic group contained in the surfactant, there may be mentioned, for example, a hydroxy group and an ethyleneoxy group.

Specific examples of commercially available products of the acetylene glycol-based surfactant include "SURFYNOL 104" (2,4,7,9-tetramethyl-5-decyne-4,7-diol; average molar number of addition of EO: 0; HLB: 3.0), "SURFYNOL 104E" (a 50% ethylene glycol-diluted solution of "SURFYNOL 104"), "SURFYNOL 104PG-50" (a 50% propylene glycol-diluted solution of "SURFYNOL 104") and "SURFYNOL 420" (an EO adduct of "SURFYNOL 104"; average molar number of addition of EO: 1.3; HLB: 4.7) all available from Air Products & Chemicals, Inc., "ACETYLENOL E13T" (average molar number of addition of EO: 1.3; HLB: 4.7) available from Kawaken Fine Chemicals Co., Ltd., and the like.

The surfactant may also contain the other surfactant(s) in addition to the aforementioned surfactants. Examples of the preferred other surfactant(s) include at least one surfactant selected from the group consisting of an anionic surfactant, a nonionic surfactant other than the aforementioned surfactants and an ampholytic surfactant. These other surfactants may be used in combination of any two or more thereof.

Of these other surfactants, preferred is the nonionic surfactant such as an alcohol-based surfactant, etc.

(Contents of Respective Components in Aqueous Gravure Ink)

The contents of the pigment, the polymer, the water-soluble organic solvent, the surfactant and water in the ink are as follows from the viewpoint of improving leveling properties of the resulting ink. The ink as used herein means an ink that is prepared in a ready-to-use state for printing without being diluted, and the aforementioned contents indicate contents of the respective components in the ink kept in such an state.

The content of the pigment in the ink is preferably not less than 2% by mass, more preferably not less than 5% by mass and even more preferably not less than 8% by mass, and is also preferably not more than 30% by mass, more preferably not more than 25% by mass and even more preferably not more than 18% by mass.

The content of the pigment-containing polymer particles in the ink is preferably not less than 3% by mass, more preferably not less than 5% by mass and even more preferably not less than 8% by mass, and is also preferably not more than 35% by mass, more preferably not more than 30% by mass, even more preferably not more than 25% by mass and further even more preferably not more than 20% by mass.

The content of the polymer in the ink is preferably not less than 1% by mass, more preferably not less than 2% by mass and even more preferably not less than 3% by mass, and is also preferably not more than 15% by mass, more preferably not more than 10% by mass and even more preferably not more than 8% by mass.

The mass ratio of the polymer (a sum of the polymer a and the polymer b) to the pigment (polymer/pigment) in the ink is preferably not less than 0.2, more preferably not less than 0.3 and even more preferably not less than 0.4, and is also preferably not more than 3, more preferably not more than 2 and even more preferably not more than 1, from the viewpoint of improving stability of the resulting ink.

The content of the water-soluble organic solvent as a whole content thereof in the ink is not less than 1% by mass, preferably not less than 2% by mass and more preferably not less than 3% by mass from the viewpoint of improving leveling properties of the resulting ink, and is also not more than 10% by mass, preferably not more than 9% by mass and more preferably not more than 8% by mass from the viewpoint of reducing a burden on the environments. More specifically, the content of the water-soluble organic solvent in the ink is preferably not less than 2% by mass and not more than 9% by mass, and more preferably not less than 3% by mass and not more than 8% by mass.

The content of the glycol ether in the ink is preferably not less than 1% by mass, more preferably not less than 2% by mass and even more preferably not less than 4% by mass, and is also preferably not more than 10% by mass, more preferably not more than 9% by mass and even more preferably not more than 8% by mass, from the viewpoint of improving leveling properties of the resulting ink.

The mass ratio of the content of the glycol ether to the whole content of the water-soluble organic solvent [(content of glycol ether)/(whole content of water-soluble organic solvent)] in the ink is preferably not less than 0.5, more preferably not less than 0.6, even more preferably not less than 0.7 and further even more preferably not less than 0.8, and is also not more than 1.

The content of the glycol in the ink is preferably not more than 5% by mass, more preferably not more than 3% by mass and even more preferably not more than 1% by mass from the viewpoint of improving leveling properties of the resulting ink. The lower limit of the content of the glycol in the ink is 0% by mass.

The content of the water-soluble organic solvent having a boiling point lower than 100° C. in the ink is preferably less than 2% by mass, more preferably less than 1% by mass and even more preferably less than 0.5% by mass from the viewpoint of improving leveling properties of the resulting ink and reducing a burden on the environments. The lower limit of the content of the water-soluble organic solvent having a boiling point lower than 100° C. in the ink is 0% by mass.

The content of the water-soluble organic solvent having a boiling point higher than 260° C. in the ink is preferably not more than 2% by mass, more preferably not more than 1% by mass and even more preferably not more than 0.5% by mass from the viewpoint of improving drying properties of the resulting ink.

The content of the surfactant in the ink is preferably not less than 0.1% by mass, more preferably not less than 0.2% by mass and even more preferably not less than 0.3% by mass, and is also preferably not more than 5% by mass, more preferably not more than 4% by mass and even more preferably not more than 3.5% by mass, from the viewpoint of improving leveling properties of the resulting ink.

The content of the silicone-based surfactant containing the constitutional unit represented by the general formula (1) in the ink is preferably not less than 0.01% by mass, more preferably not less than 0.05% by mass and even more preferably not less than 0.3% by mass, and is also preferably not more than 5% by mass, more preferably not more than 3% by mass and even more preferably not more than 2% by mass, from the viewpoint of improving leveling properties of the resulting ink.

The content of the acetylene glycol-based surfactant in the ink is preferably not less than 0.1% by mass, more preferably not less than 0.2% by mass and even more preferably not less than 0.3% by mass, and is also preferably not more than 5% by mass, more preferably not more than 3% by mass and even more preferably not more than 2% by mass, from the viewpoint of improving leveling properties of the resulting ink.

The mass ratio of the content of the silicone-based surfactant to the total content of the silicone-based surfactant and the acetylene glycol-based surfactant [(content of silicone-based surfactant)/(total content of silicone-based surfactant and acetylene glycol-based surfactant)] in the ink is preferably not less than 0.02, more preferably not less than 0.04 and even more preferably not less than 0.06, and is also preferably not more than 0.9, more preferably not more than 0.8 and even more preferably not more than 0.7.

The mass ratio of the total content of the silicone-based surfactant and the acetylene glycol-based surfactant to the content of the polymer [(total content of silicone-based surfactant and acetylene glycol-based surfactant)/(content of polymer)] in the ink is preferably not less than 0.005, more preferably not less than 0.008 and even more preferably not less than 0.01, and is also preferably not more than 0.6, more preferably not more than 0.5 and even more preferably not more than 0.4, from the viewpoint of improving leveling properties of the resulting ink.

The mass ratio of the total content of the silicone-based surfactant and the acetylene glycol-based surfactant to the content of the glycol ether [(total content of silicone-based surfactant and acetylene glycol-based surfactant)/(content of glycol ether)] in the ink is preferably not less than 0.02, more preferably not less than 0.04 and even more preferably not less than 0.06, and is also preferably not more than 0.4, more preferably not more than 0.3 and even more preferably not more than 0.25. The mass ratio of the total content of the silicone-based surfactant and the acetylene glycol-based surfactant to the content of the glycol ether [(total content of silicone-based surfactant and acetylene glycol-based surfactant)/(content of glycol ether)] in the ink is preferably not less than 0.02 and not more than 0.4, more preferably not less than 0.04 and not more than 0.3, and even more preferably not less than 0.06 and not more than 0.25.

The content of water in the ink is not less than 50% by mass, preferably not less than 55% by mass, more preferably not less than 60% by mass and even more preferably not less than 66% by mass from the viewpoint of improving leveling properties of the resulting ink while reducing a content of volatile organic compounds in the ink, and is also not more than 80% by mass, preferably not more than 78% by mass, more preferably not more than 76% by mass and even more preferably not more than 74% by mass from the viewpoint of improving leveling properties of the resulting ink while maintaining good drying properties of the ink. More specifically, the content of water in the ink is preferably not less than 55% by mass and not more than 78% by mass, more preferably not less than 60% by mass and not more than 76% by mass, and even more preferably not less than 66% by mass and not more than 74% by mass.

In the case where the ink contains an optional component(s) other than the pigment, the polymer, the water-soluble organic solvent, the surfactant and water, the optional component(s) may be incorporated into the ink by replacing a part of the content of water therewith.

The mass ratio of the total content of the silicone-based surfactant and the acetylene glycol-based surfactant to the content of water [(total content of silicone-based surfactant and acetylene glycol-based surfactant)/(content of water)] in the ink is preferably not less than 0.003, more preferably not less than 0.005 and even more preferably not less than 0.006, and is also preferably not more than 0.06, more preferably not more than 0.05 and even more preferably not more than 0.04. More specifically, the mass ratio of the total content of the silicone-based surfactant and the acetylene glycol-based surfactant to the content of water [(total content of silicone-based surfactant and acetylene glycol-based surfactant)/(content of water)] in the ink is preferably not less than 0.003 and not more than 0.06, more preferably not less than 0.005 and not more than 0.05, and even more preferably not less than 0.006 and not more than 0.04.

The ink of the present invention may also contain various additives as optional components, such as a pH modifier, a viscosity controller, a defoaming agent, an antiseptic agent, a rust preventive, etc., according to use or applications of the ink.

The Zahn cup viscosity of the ink as measured at 20° C. is preferably not less than 10 seconds, more preferably not less than 12 seconds and even more preferably not less than 13 seconds, and is also preferably not more than 25 seconds, more preferably not more than 20 seconds and even more preferably not more than 18 seconds, from the viewpoint of improving leveling properties of the resulting ink.

The pH value of the ink as measured at 20° C. is preferably not less than 5.5, more preferably not less than 6.0 and even more preferably not less than 6.5 from the viewpoint of improving dispersion stability of the resulting ink, and is also preferably not more than 11.0, more preferably not more than 10.5 and even more preferably not more than 10.0 from the viewpoint of improving the resistance of members to the ink and suppressing skin irritation.

The Zahn cup viscosity and the pH value of the ink may be measured by the respective methods described in Examples below.

[Gravure Printing Method]

The aqueous gravure ink of the present invention can be suitably used in gravure printing using a gravure printing plate. When using the ink of the present invention to print characters or images on a printing substrate by a gravure printing method, it is possible to obtain a high-resolution gravure printed material owing to excellent optical density and drying properties of the ink.

The gravure printing is such a printing method as mentioned in detail hereinunder. That is, while rotating a gravure cylinder (a gravure printing plate) on a surface of which recessed cells are formed, the aforementioned ink is fed over the surface of the gravure cylinder, and scraped off therefrom by a doctor blade fixedly mounted at a predetermined position to allow the ink to remain only within the cells. Then, a printing substrate continuously fed towards the gravure cylinder is pressure-contacted to the surface of the gravure cylinder by means of an impression cylinder whose surface is formed of a rubber to thereby transfer only the ink in the cells of the gravure cylinder to the printing substrate and thereby print characters or images on the printing substrate.

Examples of the printing substrate used in the gravure printing include papers such as a coated paper, an art paper, a synthetic paper, a processed paper, etc.; resin films such as a polyester film, a polyethylene film, a polypropylene film, a polystyrene film, a polyvinyl chloride film, a nylon film, etc.; and the like.

As the printing substrate, from the viewpoint of improving wet-spreadability of the ink over a non-water absorbing substrate, preferred are the resin films. In addition, from the viewpoint of improving suitability to after-processing treatments such as punching treatment of the resulting printed material, etc., preferred are a polyester film and a polypropylene film. These resin films may be in the form of either a biaxially oriented film, a monoaxially oriented film or a non-oriented film.

In addition, from the viewpoint of improving gravure printability, there may also be used such a resin film whose surface is subjected to electrical discharge treatments such as corona treatment, plasma treatment, etc.

EXAMPLES

In the following Production Examples, Preparation Examples, Examples and Comparative Examples, the "part(s)" and "%" indicate "part(s) by mass" and "% by mass", respectively, unless otherwise specified. Meanwhile, the respective properties, etc., were measured by the following methods.

(1) Measurement of Weight-Average Molecular Weight of Polymer

The weight-average molecular weight of the polymer was measured by gel chromatography [GPC apparatus: "HLC-8320GPC" available from Tosoh Corporation; columns: "TSKgel Super AWM-H", "TSKgel Super AW3000" and "TSKgel guard column Super AW-H" all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using kits of monodisperse polystyrenes having previously known molecular weights [PStQuick B(F-550, F-80, F-10, F-1, A-1000), PStQuick C(F-288, F-40, F-4, A-5000, A-500] all available from Tosoh Corporation as a reference standard substance.

As a sample to be measured, there was used a dispersion prepared by mixing 0.1 g of the resin with 10 mL of the aforementioned eluent in a glass vial, stirring the resulting mixture with a magnetic stirrer at 25° C. for 10 hours, and then subjecting the mixture to filtration treatment through a syringe filter "DISMIC-13HP PTFE" (0.2 μm) available from Advantec Co., Ltd.

(2) Measurement of Acid Value of Polymer

In an automatic potentiometric titrator (power burette; "Model No.: APB-610") available from Kyoto Electronics Manufacturing Co., Ltd., the polymer was dissolved in a titrant solution prepared by mixing toluene and acetone (2:1), and the resulting solution was subjected to titration with a 0.1N potassium hydroxide/ethanol solution by a potentiometric titration method until reaching an end point of the titration observed as an inflection point of the titration curve. The acid value of the polymer was calculated from an amount (titer) of the potassium hydroxide solution used in the titration until reaching the end point.

(3) Measurement of Solid Contents of Water Dispersion and Dispersion

Using an infrared moisture meter "FD-230" available from Kett Electric Laboratory, 5 g of a sample to be measured was dried at a drying temperature of 150° C. under a measuring mode 96 (monitoring time: 2.5 minutes/variation range: 0.05%) to measure solid contents of the water dispersion and the dispersion.

(4) Measurement of Average Particle Sizes of Pigment-Containing Polymer Particles and Polymer Particles The cumulant analysis of the particles was conducted using a laser particle analyzing system "ELS-8000" available from Otsuka Electrics Co., Ltd., to measure an average particle size thereof. In the measurement, there was used a dispersion prepared by diluting it with water such that a concentration of the particles in the dispersion was adjusted to about $5 \times 10^{-3}\%$ by weight. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The thus measured cumulant average particle size was defined as respective average particle sizes of the pigment-containing polymer particles and the polymer particles.

(5) Measurement of Epoxy Equivalent of Epoxy Compound

The epoxy equivalent of the epoxy compound was measured by a potentiometric titration method using a automatic potentiometric titrator "AT-610" available from Kyoto Electronics Manufacturing Co., Ltd., according to JIS K7236.

(6) Measurement of Zahn-Cup Viscosity of Ink

The viscosity of the ink was measured at 20° C. using a Zahn cup viscometer (No. 3) available from RIGO Co., Ltd.

(7) Measurement of pH of Ink

The pH value of the ink was measured at 20° C. using a bench-top pH meter "F-71" available from Horiba Ltd., equipped with a pH electrode "6337-10D" available from Horiba Ltd.

(8) Calculation of [a+b]/[m/n] in General Formula (1)

The ratio [a+b]/[m/n] was calculated from the measurement results of the proton nuclear magnetic resonance ($^1$H-NMR) spectroscopy conducted under the following conditions.

One hundred milligrams of a sample to be measured were diluted with 2.0 mL of trimethylsilyl-free heavy chloroform "Chloroform d-1 for NMR" (deuteration ratio: 99.8%) available from Kanto Chemical Co., Inc., and the thus obtained dilute solution was subjected to NMR measurement using a tube for $^1$H-NMR having a diameter of 5.0 mm by an apparatus "Agilent-NMR-vmrs400" (400 MHz) available from Varian Inc., under the measuring conditions of pulse width: 45 μs (45° pulse); swatch width: 6410 Hz; wait time: 10 seconds; cumulative number: 8 times; measuring temperature: room temperature.

The method of calculating the ratio of [a+b]/[m/n] is explained below by referring to an exemplary case where "SILFACE SAG 002" available from Nissin Chemical Co., Ltd., was used as the silicone-based surfactant.

The peak area value of δ (ppm): 0.3-0.6 was set to 2 (2H: fixed value). As a result, the ratio of the EO- or PO-modified Si element in a molecule of the surfactant to be measured became 1, and the aforementioned value was therefore used to determine the ratio [m/n] between the modified and unmodified Si elements.

(8-1) Calculation of m/n

The value (area value 3) of protons of the methyl group ($CH_3$) directly bonded to the EO- or PO-modified Si element is subtracted from the peak area value of δ (ppm): 0-0.5, and further the obtained value is divided by the value (area value 6) of the two methyl groups ($CH_3$) directly bonded to the EO- or PO-unmodified Si element to thereby calculate the ratio [m/n] between the modified and unmodified Si elements.

$m/n$={[peak area value of 0-0.5]−[methyl group 3H directly bonded to modified Si element]}/ [methyl groups 6H directly bonded to unmodified Si element]=(19−3)/6=2.67

(8-2) Calculation of a (Average Molar Number of Addition of PO in Molecule)

The average molar number a of addition of PO is calculated by dividing the peak area value of δ=1.0-1.2 by the value of 3H of the methyl group ($CH_3$) of PO.

$a$=[peak area value of 1.0-1.2]/[methyl group (3H) of PO chain]=0/3=0

(8-3) Calculation of b (Average Molar Number of Addition of EO in Molecule)

The peak area value of δ=3.0-3.8 is a total peak area value of a methylene group ($CH_2$/2H) directly bonded to an oxygen element of EO or PO, hydrogens of (CH, $CH_2$) of PO (3H×average molar number of addition of PO) and EO ($CH_2$—$CH_2$/4H×average molar number of addition of EO).

$b$={[peak area value of δ=3.0-3.8]−[hydrogens (3H) of (CH, $CH_2$) of PO]×$a$−[methylene group ($CH_2$/2H) directly bonded to oxygen element of EO or PO]}/[hydrogens (4H) of EO ($CH_2$—$CH_2$)]=(43.1−3×(0)−2)/4=10.28

From the values of [min], a and b obtained above, the ratio of [a+b]/[m/n] of "SILFACE SAG 002" was calculated to be 3.85 as follows.

$[a+b]/[m/n]$=(0+10.28)/2.67=3.85

In the case where the other silicone-based surfactants were used, the ratio of [a+b]/[m/n] thereof was calculated in the same method as described above.

Production Example 1 (Production of Water Dispersion of Pigment-Containing Polymer Particles)

(1) Two hundred thirty six parts of ion-exchanged water were weighed and placed in a 2 L-capacity flask, and then 60 parts of a water-insoluble styrene-acrylic polymer "JONCRYL 690" (tradename; weight-average molecular weight: 16500; acid value: 240 mgKOH/g) available from BASF AG and 36.5 parts of a 5N sodium hydroxide solution (sodium neutralization degree: 60 mol %) were added to the flask. The contents of the flask were stirred for 2 hours using an anchor blade at 200 rpm, thereby obtaining 332.5 parts of a styrene-acrylic polymer aqueous solution (solid content: 19.9%).

A 2 L-capacity vessel equipped with a disper blade was charged with 331.7 parts of the aforementioned aqueous solution and 448.3 parts of ion-exchanged water, and the contents of the vessel were stirred using a disper "ULTRA DISPER" (tradename) available from Asada Iron Works Co., Ltd., at 1400 rpm for 15 minutes while cooling in a water bath at 0° C.

(2) Next, 220 parts of a magenta pigment (C.I. Pigment Red 146) were added to the vessel, and the contents of the vessel were stirred at 6400 rpm for 1 hour. The resulting dispersion liquid was charged into a wet disperser "Ultra Apex Mill UAM05" (tradename) available from HIROSHIMA METAL & MACHINERY Co., Ltd., packed with 0.3 mmφ zirconia beads "XTZ Ball" (tradename) available from Nikkato Corporation at a packing rate of 80%, and subjected to dispersion treatment by passing the dispersion liquid through the disperser 5 times at a peripheral speed of 8 m/s and a flow rate of 200 g/min while cooling the dispersion liquid with chilled water at 5° C., followed by subjecting the resulting dispersion to filtration treatment through a 200-mesh wire mesh screen.

(3) Added to 500 parts of the above-obtained filtrate (pigment: 110 parts; polymer: 33 parts) were 7.3 parts of "DENACOL EX-321L" (trimethylolpropane polyglycidyl ether; epoxy equivalent: 129) available from Nagase ChemteX Corporation (corresponding to 40 mol % on the basis of a carboxylic acid acting as a crosslinking reaction site contained in an acrylic acid moiety in the polymer) and 1 part of "Ploxel LV(S)" (mildew-proof agent; active ingredient content: 20%) available from LONZA Japan K.K., and 43.2 parts of ion-exchanged water were further added thereto such that a solid content of the resulting dispersion was 27.3%. The obtained dispersion was stirred at 70° C. for 3 hours, and then subjected to filtration treatment through a 200-mesh wire mesh screen, thereby obtaining 550.5 parts of a water dispersion of pigment-containing polymer particles (content of pigment-containing polymer particles: 27.3%; average particle size: 280 nm). Meanwhile, the polymer constituting the pigment-containing polymer particles was in the form of a water-insoluble polymer.

Production Example 2 (Production of Dispersion of Pigment-Free Water-Insoluble Polymer Particles)

A reaction vessel equipped with a dropping funnel was charged with 0.5 part of methacrylic acid, 14.5 parts of methyl methacrylate available from FUJIFILM Wako Pure Chemical Corporation, 5.0 parts of 2-ethylhexyl acrylate available from FUJIFILM Wako Pure Chemical Corporation, 11.1 parts of "LATEMUL E-118B" (sodium polyoxyethylenealkylethersulfate) as a surfactant available from Kao Corporation, 0.2 part of potassium persulfate as a polymerization initiator available from FUJIFILM Wako Pure Chemical Corporation and 282.8 parts of ion-exchanged water, followed by mixing the contents of the reaction vessel with each other at 150 rpm. Then, an inside atmosphere of the reaction vessel was replaced with nitrogen gas, thereby obtaining an initially charged monomer solution.

Then, 9.5 parts of the methacrylic acid, 275.5 parts of the methyl methacrylate, 95.0 parts of the 2-ethylhexyl acrylate, 35.1 parts of "LATEMUL E-118B", 0.6 part of the potassium persulfate and 183.0 parts of ion-exchanged water were mixed with each other at 150 rpm to prepare a dropping monomer solution. The resulting dropping monomer solution was charged into the dropping funnel, and an inside atmosphere of the dropping funnel was replaced with nitrogen gas.

In a nitrogen atmosphere, the initially charged monomer solution in the reaction vessel was heated from room temperature to 80° C. over 30 minutes while stirring at 150 rpm, and while maintaining the initially charged monomer solution at 80° C., the monomers in the dropping funnel were gradually added dropwise to the reaction vessel over 3 hours. After completion of the dropwise addition, while maintaining the inside temperature of the reaction vessel, the resulting mixed solution in the reaction vessel was stirred for 1 hour, and mixed with 204.7 parts of ion-exchanged water. Then, the resulting dispersion was filtered through a stainless steel wire mesh screen (200 mesh), thereby obtaining a dispersion of water-insoluble polymer particles (solid content: 40%; average particle size: 100 nm; acid value of polymer: 16 mgKOH/g).

<Preparation of Inks for Gravure Printing>

Example 1 (Preparation of Ink 1)

In a production vessel, 57.6 parts of the water dispersion of the pigment-containing polymer particles obtained in Production Example 1 (content of pigment in ink: 11.5 parts; content of pigment-containing polymer particles in ink: 15.7 parts) were mixed with 0.27 part of a neutralizing agent (a 5N sodium hydroxide solution) available from FUJIFILM Wako Pure Chemical Corporation and 12.5 parts of the dispersion of the pigment-free water-insoluble polymer particles obtained in Production Example 2 (corresponding to a polymer content of 5.0% in the ink; solid content: 40%) so as to prepare an ink composition shown in Table 1, followed by stirring the contents of the production vessel at 150 rpm.

Moreover, 7.0 parts of diethylene glycol monoisobutyl ether (iBDG; boiling point: 220° C.) available from FUJIFILM Wako Pure Chemical Corporation, 0.5 part of a silicone-based surfactant "KF642" (tradename) available from Shin-Etsu Chemical Co., Ltd., 1.0 part of an acetylene glycol-based surfactant "SURFYNOL 104PG-50" [tradename; a 50% propylene glycol-diluted solution of "SURFYNOL 104" (2,4,7,9-tetramethyl-5-decyne-4,7-diol (HLB: 3.0))] available from Air Products & Chemicals, Inc., 0.4 part of a thickening agent "ADEKANOL UH-420" (tradename; nonionic polymer surfactant; aqueous solution having an active ingredient content of 30%) available from ADEKA Corporation, and ion-exchanged water were added to the production vessel, followed by stirring the contents of the production vessel at room temperature for 30 minutes. Then, the resulting dispersion was subjected to filtration treatment through a stainless steel wire mesh screen (200 mesh), thereby obtaining an aqueous gravure ink.

The results are shown in Table 1. Incidentally, the amounts of the respective components compounded as shown in Table 1 represent amounts of the components in terms of active ingredient contents thereof. Since the total amount of the components compounded was 100 parts, the content of water in the gravure ink was 70.63 parts.

In addition, the Zahn-cup viscosity of the aqueous gravure ink as measured at 20° C. was 14 seconds, and the pH value thereof as measured at 20° C. was 7.6.

Meanwhile, the respective notations shown in Tables 1 and 2 are as follows.

(Water-Soluble Organic Solvent)
  PG: Propylene glycol (boiling point: 188° C.)
  iBDG: Diethylene glycol monoisobutyl ether (boiling point: 220° C.)
  BTG: Triethylene glycol monobutyl ether (boiling point: 278° C.)
  BDG: Diethylene glycol monobutyl ether (boiling point: 231° C.)
  MG: Ethylene glycol monomethyl ether (boiling point: 125° C.)
  MDG: Diethylene glycol monomethyl ether (boiling point: 194° C.)
  iPG: Ethylene glycol monoisopropyl ether (boiling point: 142° C.)
  iPDG: Diethylene glycol monoisopropyl ether (boiling point: 207° C.)

The aforementioned water-soluble organic solvents all were available from FUJIFILM Wako Pure Chemical Corporation.

(Silicone-Based Surfactant)
  KF-642 (In the general formula (1), a=0; b=14.97; [min]= 4.56; [a+b]/[m/n]=3.28)
  KF-643 (In the general formula (1), a=0; b=10.11; [min]= 2.59; [a+b]/[m/n]=3.90)
  KF-644 (In the general formula (1), a=0; b=9.87; [min]= 2.54; [a+b]/[m/n]=3.88)
  KF-355A (In the general formula (1), a=0; b=16.40; [min]=4.10; [a+b]/[m/n]=4.08)
  SAG002 (In the general formula (1), a=0; b=10.28; [min]= 2.67; [a+b]/[m/n]=3.85; "SILFACE SAG 002" available from Nissin Chemical Co., Ltd.)
  TEGO 240 (In the general formula (1), a=0; b=12.0; [min]=5.70; [a+b]/[m/n]=2.11; "TEGO Wet 240" available from Evonik Japan Co., Ltd.)
  KF-352A (In the general formula (1), a=35.16; b=37.1; [min]=11.3; [a+b]/[min]=6.41)

KF-353A (In the general formula (1), a=0; b=11.6; [min]= 7.8; [a+b]/[m/n]=1.48)

KF-6011 (In the general formula (1), a=0; b=16.15; [min]=3.48; [a+b]/[m/n]=4.64)

KF-6012 (In the general formula (1), a=39.10; b=41.6; [min]=11.6; [a+b]/[m/n]=6.96)

KF-6017 (In the general formula (1), a=0; b=11.36; [min]=25.45; [a+b]/[m/n]=0.45)

Meanwhile, the "KF" series products are polyether-modified silicone-based surfactants available from Shin-Etsu Chemical Co., Ltd. In addition, all of the silicone-based surfactants used in Examples are the compounds of the general formula (1) which are capable of satisfying such a condition that m is a number of not less than 1 and not more than 200; n is a number of not less than 1 and not more than 100; and R is a hydrogen atom or an alkyl group having 1 to 15 carbon atoms.

Examples 2 to 0.1.5 and Comparative Examples 1 to 8

The same procedure as in Example 1 was repeated except that the formulation of the ink in Example 1 was changed to those shown in Tables 1 and 2, thereby obtaining inks 2 to 15 and 21 to 28.

(1) Printing Test

Using the inks 1 to 15 obtained in Examples 1 to 15, respectively, and the inks 21 to 28 obtained in Comparative Examples 1 to 8, respectively, gravure printing was conducted on a corona discharge-treated surface of an OPP film "FOR-AQ #20" (laminate grade) available from Futamura Chemical Co, Ltd. In the gravure printing, a solid image having an optical density of 100% was printed by an electronic engraving plate (number of lines: 175 lines/in; plate depth: 31 μm) attached to a bench-top gravure printing tester "K PRINTING PROOFER" available from MATSUO SANGYO Co., Ltd., thereby obtaining a printed material.

(2) Method for Evaluating Optical Density

The optical density of the printed portion was measured using a spectrophotometer "SpectroEye" (tradename) available from GretagMacbeth AG under a measuring mode (DIN, Abs). The optical density was evaluated according to the following evaluation ratings.

When the evaluation result was A or B, the ink could be used in the practical applications without problems.

(Evaluation Ratings)
A: Not less than 1.9
B: Not less than 1.7 and less than 1.9
C: Less than 1.7

(3) Method for Evaluating Drying Properties

After conducting the solid image printing as described in the above (1), the obtained printed material was dried in a dryer "Drying Oven DSV402" available from Yamato Scientific Co., Ltd., which was set to a temperature of 60° C., for 1 minute. Then, the printed surface of the printed material thus dried was rubbed with fingers. The thus rubbed printed surface was visually observed to examine whether or not any transfer of the ink occurred, and the drying properties of the ink was evaluated according to the following evaluation ratings. Incidentally, when the optical density was evaluated as being the rating "C" in the above item, the ink on the printed material was insufficient in wet-spreadability, and it was therefore impossible to perform adequate evaluation of the drying properties. Thus, in such a case, no evaluation procedure for drying properties of the ink was conducted.

When the evaluation result was "A", the ink could be used in the practical applications without problems.

(Evaluation Ratings)
A: No transfer of the ink occurred.
B: Transfer of the ink occurred.
-: No evaluation procedure was conducted.

TABLE 1-1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| | No. of gravure ink | | 1 | 2 | 3 | 4 | 5 | 6 | 7 | 8 | 9 | 10 |
| Composition of gravure ink (%) | Pigment-containing polymer particles | | | | | | | | | | | |
| | Amount of pigment (%) | | 11.5 | 11.5 | 11.5 | 11.5 | 11.5 | 11.5 | 11.5 | 11.5 | 11.5 | 11.5 |
| | Amount of polymer (%) | | 4.2 | 4.2 | 4.2 | 4.2 | 4.2 | 4.2 | 4.2 | 4.2 | 4.2 | 4.2 |
| | Pigment-free polymer particles | | 5.0 | 5.0 | 5.0 | 5.0 | 5.0 | 5.0 | 5.0 | 5.0 | 5.0 | 5.0 |
| | Solvent | PG 188° C.[1] | 0.5 | 0.5 | 0.5 | 0.5 | 0.5 | 0.5 | 0.5 | 0.5 | 0.5 | 0.5 |
| | | iBDG 220° C.[1] | 7.0 | 7.0 | 7.0 | 7.0 | 7.0 | 7.0 | 7.0 | 7.0 | 5.0 | 3.0 |
| | | BTG 278° C.[1] | | | | | | | | | | |
| | Silicone-based surfactant | KF-642 3.28[2] | 0.5 | | | | | | | | | |
| | | KF-643 3.90[2] | | 0.5 | | | | | | | 0.5 | 0.5 |
| | | KF-644 3.88[2] | | | 0.5 | | | | | | | |
| | | KF-355A 4.08[2] | | | | 0.5 | | | | | | |
| | | SAG002 3.85[2] | | | | | 0.5 | | | | | |
| | | TEGO 240 2.11[2] | | | | | | 1.0 | 0.5 | 0.05 | | |
| | | KF-352A 6.41[2] | | | | | | | | | | |
| | | KF-353A 1.48[2] | | | | | | | | | | |
| | | KF-6012 6.96[2] | | | | | | | | | | |
| | | KF-6017 0.45[2] | | | | | | | | | | |
| | Acetylene glycol-based surfactant | | 0.5 | 0.5 | 0.5 | 0.5 | 0.5 | 0.5 | 0.5 | 0.5 | 0.5 | 0.5 |
| | Thickening agent | | 0.12 | 0.12 | 0.12 | 0.12 | 0.12 | 0.12 | 0.12 | 0.12 | 0.12 | 0.12 |
| | Neutralizing agent | | 0.05 | 0.05 | 0.05 | 0.05 | 0.05 | 0.05 | 0.05 | 0.05 | 0.05 | 0.05 |
| | Ion-exchanged water | | bal.** | bal.** | bal.** | bal.** | bal.** | bal.** | bal.** | bal.** | bal.** | bal.** |
| Evaluation | Optical density | | B (1.86) | A (1.91) | A (1.94) | B (1.80) | A (1.90) | A (1.95) | A (1.90) | B (1.75) | A (1.91) | B (1.85) |
| | Drying properties | | A | A | A | A | A | A | A | A | A | A |

Note
[1]Boiling point;
[2]Value of [a + b]/[m/n];
bal.**: balance

TABLE 1-2

|  |  |  | Comparative Examples | | | | | | |
|---|---|---|---|---|---|---|---|---|---|
|  |  |  | 1 | 2 | 3 | 4 | 5 | 6 | 7 |
| | No. of gravure ink | | 21 | 22 | 23 | 24 | 25 | 26 | 27 |
| Composition of gravure ink (%) | Pigment-containing polymer particles | | | | | | | | |
| | Amount of pigment (%) | | 11.5 | 11.5 | 11.5 | 11.5 | 11.5 | 11.5 | 11.5 |
| | Amount of polymer (%) | | 4.2 | 4.2 | 4.2 | 4.2 | 4.2 | 4.2 | 4.2 |
| | Pigment-free polymer particles | | 5.0 | 5.0 | 5.0 | 5.0 | 5.0 | 5.0 | 5.0 |
| | Solvent | PG | 188° C.[*1] | 0.5 | 0.5 | 0.5 | 0.5 | 0.5 | 0.5 | 7.5 |
| | | iBDG | 220° C.[*1] | 7.0 | 7.0 | 7.0 | 7.0 | 15.0 | | |
| | | BTG | 278° C.[*1] | | | | | | 7.0 | |
| | Silicone-based surfactant | KF-642 | 3.28[*2] | | | | | | | |
| | | KF-643 | 3.90[*2] | | | | | | | |
| | | KF-644 | 3.88[*2] | | | | | | | |
| | | KF-355A | 4.08[*2] | | | | | | | |
| | | SAG002 | 3.85[*2] | | | | | | | |
| | | TEGO 240 | 2.11[*2] | | | | | | 0.05 | 0.05 | 0.05 |
| | | KF-352A | 6.41[*2] | 0.5 | | | | | | |
| | | KF-353A | 1.48[*2] | | 0.5 | | | | | |
| | | KF-6012 | 6.96[*2] | | | 0.5 | | | | |
| | | KF-6017 | 0.45[*2] | | | | 0.5 | | | |
| | Acetylene glycol-based surfactant | | 0.5 | 0.5 | 0.5 | 0.5 | 0.5 | 0.5 | 0.5 |
| | Thickening agent | | 0.12 | 0.12 | 0.12 | 0.12 | 0.12 | 0.12 | 0.12 |
| | Neutralizing agent | | 0.05 | 0.05 | 0.05 | 0.05 | 0.05 | 0.05 | 0.05 |
| | Ion-exchanged water | | bal.** | bal.** | bal.** | bal.** | bal.** | bal.** | bal.** |
| Evaluation | Optical density | | C (1.69) | C (1.65) | C (1.69) | C (1.63) | A (1.95) | B (1.85) | C (1.58) |
| | Drying properties | | — | — | — | — | B | B | — |

Note
[*1] Boiling point;
[*2] Value of [a + b]/[m/n];
bal.**: balance

TABLE 2

|  |  |  | Examples | | | | | Comparative Example |
|---|---|---|---|---|---|---|---|---|
|  |  |  | 11 | 12 | 13 | 14 | 15 | 8 |
| | No. of gravure ink | | 11 | 12 | 13 | 14 | 15 | 28 |
| Composition of gravure ink (%) | Pigment-containing polymer particles | | | | | | | |
| | Amount of pigment (%) | | 11.5 | 11.5 | 11.5 | 11.5 | 11.5 | 11.5 |
| | Amount of polymer (%) | | 4.2 | 4.2 | 4.2 | 4.2 | 4.2 | 4.2 |
| | Pigment-free polymer particles | | 5.0 | 5.0 | 5.0 | 5.0 | 5.0 | 5.0 |
| | Water-soluble organic solvent | PG | 188° C.[*1] | 0.5 | 0.5 | 0.5 | 0.5 | 0.5 | 0.5 |
| | | iBDG | 220° C.[*1] | | | | | | 7.0 |
| | | BDG | 231° C.[*1] | 7.0 | | | | | |
| | | MG | 125° C.[*1] | | 7.0 | | | | |
| | | MDG | 194° C.[*1] | | | 7.0 | | | |
| | | iPG | 142° C.[*1] | | | | 7.0 | | |
| | | iPDG | 207° C.[*1] | | | | | 7.0 | |
| | Silicone-based surfactant | | | | | | | | |
| | TEGO 240 | 2.11[*2] | 0.5 | 0.5 | 0.5 | 0.5 | 0.5 | |
| | KF-6011 | 4.64[*2] | | | | | | 0.5 |
| | Acetylene glycol-based surfactant | | 0.5 | 0.5 | 0.5 | 0.5 | 0.5 | 0.5 |
| | Thickening agent | | 0.12 | 0.12 | 0.12 | 0.12 | 0.12 | 0.12 |
| | Neutralizing agent | | 0.05 | 0.05 | 0.05 | 0.05 | 0.05 | 0.05 |
| | Ion-exchanged water | | bal.** | bal.** | bal.** | bal.** | bal.** | bal.** |
| Evaluation | Optical density | | A (1.91) | B (1.82) | A (1.95) | A (1.91) | A (1.91) | C (1.55) |
| | Drying properties | | A | A | A | A | A | — |

Note
[*1] Boiling point;
[*2] Value of [a + b]/[m/n];
bal.**: balance

From the results shown in Tables 1 and 2, it was confirmed that the gravure inks 1 to 15 obtained in Examples 1 to 15, respectively, were excellent in optical density and drying properties as compared to the gravure inks 21 to 28 obtained in Comparative Examples 1 to 8, respectively.

INDUSTRIAL APPLICABILITY

The aqueous gravure ink of the present invention has a less burden on the environments, and is useful as a gravure ink that is excellent in optical density and drying properties

The invention claimed is:

1. An aqueous gravure ink comprising a pigment, a water-soluble organic solvent, a surfactant and water, in which:
the water-soluble organic solvent comprises a glycol ether having a boiling point of not lower than 100° C. and not higher than 260° C.;
the surfactant comprises a silicone-based surfactant comprising a constitutional unit represented by the following formula (1);
a content of the water-soluble organic solvent in the ink is not less than 1% by mass and not more than 10% by mass; and
a content of water in the ink is not less than 50% by mass and not more than 80% by mass,

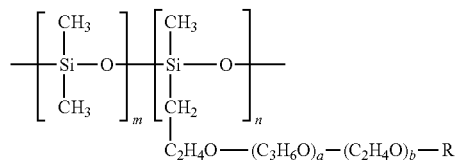

wherein m and n are numbers of respective structural units; a is an integer of not less than 0 and not more than 40; b is an integer of not less than 1 and not more than 40; R is a hydrogen atom or an alkyl group; and a ratio of [(a+b)/(m/n)] is not less than 1.60 and not more than 4.5.

2. The aqueous gravure ink according to claim 1, further comprising a water-insoluble polymer.

3. The aqueous gravure ink according to claim 1, wherein the surfactant further comprises an acetylene glycol-based surfactant.

4. The aqueous gravure ink according to claim 3, wherein a mass ratio of a total content of the silicone-based surfactant and the acetylene glycol-based surfactant to a content of the glycol ether [(total content of silicone-based surfactant and acetylene glycol-based surfactant)/(content of glycol ether)] is not less than 0.02 and not more than 0.4.

5. The aqueous gravure ink according to claim 3, wherein a mass ratio of the total content of the silicone-based surfactant and the acetylene glycol-based surfactant to the content of water [(total content of silicone-based surfactant and acetylene glycol-based surfactant)/(content of water)] is not less than 0.003 and not more than 0.06.

6. The aqueous gravure ink according to claim 3, wherein a mass ratio of a content of the silicone-based surfactant to the total content of the silicone-based surfactant and the acetylene glycol-based surfactant [(content of silicone-based surfactant)/(total content of silicone-based surfactant and acetylene glycol-based surfactant)] is not less than 0.02 and not more than 0.9.

7. The aqueous gravure ink according to claim 1, wherein the glycol ether is at least one compound selected from the group consisting of an alkylene glycol monoalkyl ether and an alkylene glycol dialkyl ether, the number of carbon atoms of an alkyl group in the glycol ether is not less than 1 and not more than 8, and the alkylene glycol of the glycol ether is at least one compound selected from the group consisting of ethylene glycol and propylene glycol which have a polymerization degree of not less than 1 and not more than 3.

8. The aqueous gravure ink according to claim 1, wherein the glycol ether is the alkylene glycol monoalkyl ether.

9. The aqueous gravure ink according to claim 1, wherein the content of the glycol ether in the ink is not less than 1% by mass and not more than 10% by mass.

10. The aqueous gravure ink according to claim 1, wherein a mass ratio of the content of the glycol ether to a whole content of the water-soluble organic solvent [(content of glycol ether)/(whole content of water-soluble organic solvent)] in the ink is not less than 0.5 and not more than 1.

11. The aqueous gravure ink according to claim 1, wherein a content of the water-soluble organic solvent having a boiling point of lower than 100° C. in the ink is less than 2% by mass.

12. The aqueous gravure ink according to claim 1, wherein the water-soluble organic solvent further comprises a glycol.

13. The aqueous gravure ink according to claim 12, wherein a content of the glycol in the ink is not more than 5% by mass.

* * * * *